(12) United States Patent
Chan

(10) Patent No.: US 7,976,035 B2
(45) Date of Patent: Jul. 12, 2011

(54) FOLDABLE SCOOTER

(75) Inventor: Choi Wan Chan, Hong Kong (HK)

(73) Assignee: Nicer Holdings Limited, Hong Kong (HK)

( * ) Notice: Subject to any disclaimer, the term of this patent is extended or adjusted under 35 U.S.C. 154(b) by 555 days.

(21) Appl. No.: 12/117,730

(22) Filed: May 8, 2008

(65) Prior Publication Data

US 2009/0278327 A1 Nov. 12, 2009

(51) Int. Cl.
*B62M 1/00* (2010.01)
(52) U.S. Cl. .................................................. 280/87.05
(58) Field of Classification Search ............. 280/87.021, 280/87.041, 87.05, 14.27, 14.28
See application file for complete search history.

(56) References Cited

U.S. PATENT DOCUMENTS

| | | | |
|---|---|---|---|
| 6,234,501 B1 | 5/2001 | Chen | |
| 6,270,095 B1 | 8/2001 | Chang | |
| 6,283,485 B1 * | 9/2001 | Tsai | 280/87.05 |
| 6,378,880 B1 * | 4/2002 | Lin | 280/87.05 |
| 6,450,517 B1 * | 9/2002 | Lee | 280/87.041 |
| 7,156,405 B1 | 1/2007 | Ming | |
| 2005/0280223 A1 * | 12/2005 | Su | 280/14.27 |

* cited by examiner

*Primary Examiner* — Frank B Vanaman

(57) ABSTRACT

A foldable scooter includes a footboard, a steering column and a connecting member in between. The connecting member includes a stopper for engaging the connecting member with the notches disposed at a front portion of the footboard in the open condition. The connecting member also includes a rotatable locking member having a first biasing device for biasing the locking member against the connecting member in the open and folded conditions, an actuating end, a first locking end and a second locking end rotatable to a first and second locked position correspondingly for locking the connecting member to the footboard in the open and folded conditions. The locking member can be easily and conveniently released from the first and second locked positions by pressing the actuating end.

16 Claims, 12 Drawing Sheets

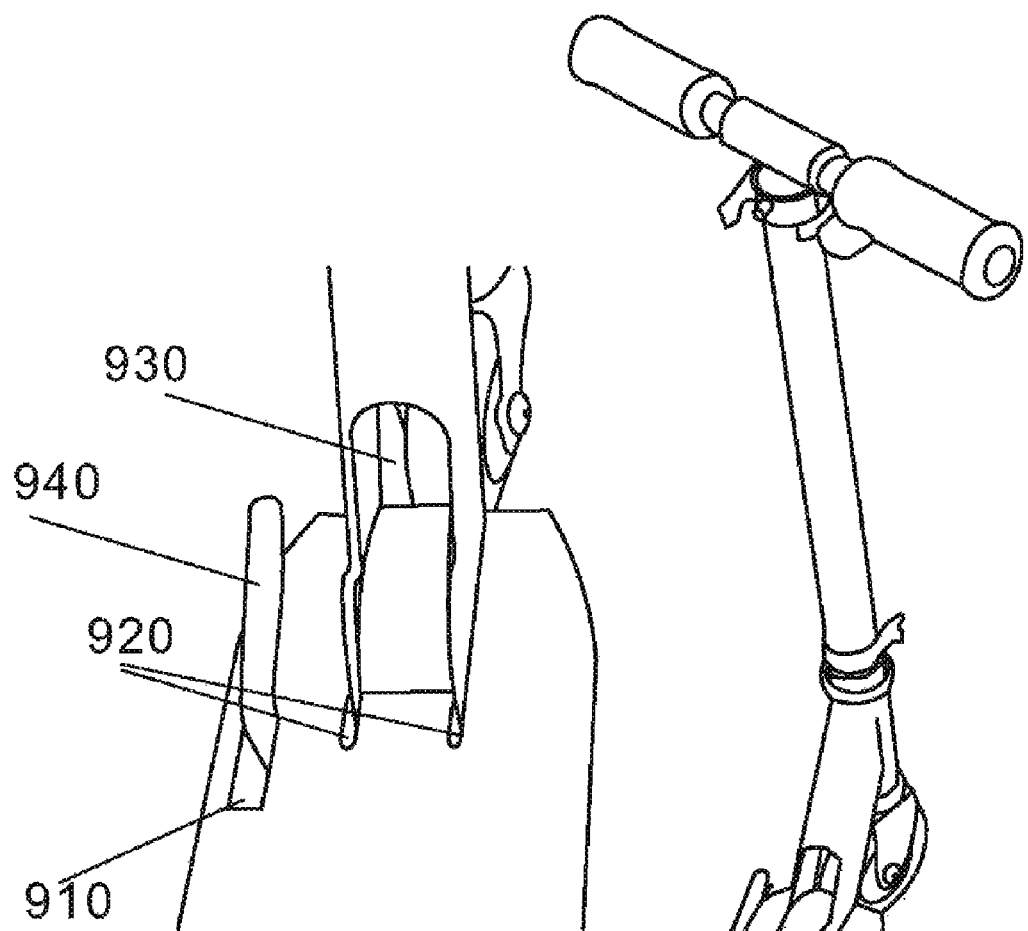
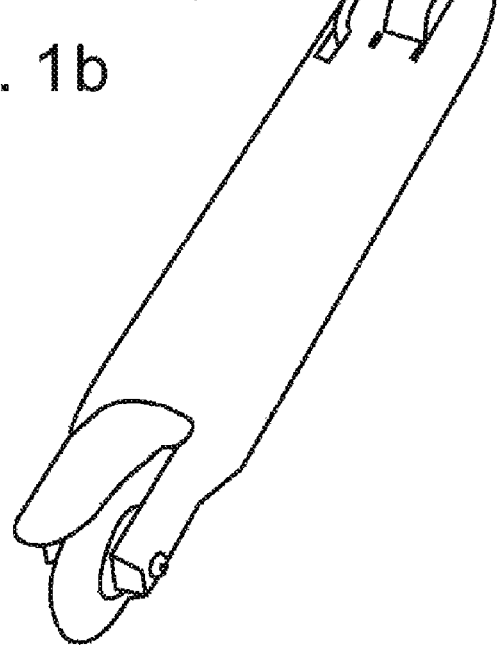
PRIOR ART
Fig. 1a
Fig. 1b

FOLDABLE SCOOTER

FIELD OF THE INVENTION

The present invention relates to a foldable scooter.

BACKGROUND OF THE INVENTION

There are numerous foldable scooters, for example, the U.S. Pat. Nos. 6,270,095B1 and U.S. Pat. No. 6,234,501B1. The main disadvantage of the scooters in these two cited arts is that the folding mechanism is located on the footboard and is exposed to the outside, which can be easily activated by the user when riding the scooter by accident. The location of the mounting seats on the footboard also causes inconvenience to the user when riding the scooter. The mounting seats being exposed will easily injure the user when accident occurs. A better scooter is to be provided to eliminate any parts that stick out from the surface of the scooter.

The mounting seats in U.S. Pat. No. 7,156,405B1 are covered by a connector plate, but the slots on the plate are dangerous features as the user may inadvertently place the finger in the slot when folding the scooter, and be injured by the flanges moving in the slots.

There is another foldable scooter existing in the market as shown in FIGS. 1a and 1b. The disadvantage of this foldable scooter is that such folding assembly contains many open slots 910, 920, 930 for the corresponding parts to slide therein or to provide space for the folding, which cause potential hazards to the user when folding the scooter. The user may accidentally place the finger in one of the slots 910, 920, 930 and be injured when the scooter is being folded.

The lever 940 being located on the upper surface of the footboard also causes inconvenience to the user riding the scooter. When riding the scooter, the user may accidentally kick the lever and cause the scooter to collapse to the folded condition. The footboard should be kept free from any mechanical parts.

Pulling the handle requires force from the user to release the folding mechanism. An improved scooter is to be provided to adopt a more easy and convenient mechanism to release the folding mechanism.

SUMMARY OF THE INVENTION

It is an objective of the present invention to provide an improved foldable scooter which is more safe and convenient to the user.

The scooter of the present invention includes a footboard, a steering column and a connecting member in between. The connecting member includes a front portion rotatably connected to the steering column, a rear portion pivotally connected to the front portion of the footboard, and a stopper disposed at the rear portion for engaging the connecting member with the notch disposed at a front portion of the footboard in the open condition.

The connecting member also includes a rotatable locking member. The locking member includes a first biasing device for biasing the locking member against the connecting member in the open and folded conditions, an actuating end, a first and a second locking end rotatable to a corresponding first and second locked position for locking the connecting member to the footboard in the open and folded conditions.

In a preferred embodiment, the front portion of the footboard further includes an extended open housing aligned with and receiving the connecting member in the open condition. The notch is formed at the base of the extended open housing. The locking member is pivotally connected to a cut formed on the first surface of the extended open housing, and is substantially aligned with the first surface.

An advantage of the present invention is that the locking member can be easily and conveniently released from the first and second locked positions by pressing the actuating end.

Another advantage is that the locking member is substantially aligned with the first surface of the extended open housing and does not stick out from the first surface which causes potential danger to the user. The locking member will not be inadvertently activated by the user riding the scooter.

In the present invention, the main parts involved in the folding mechanism including the pivot pin, the stopper and the notch are all substantially shielded from the user riding the scooter.

The present invention eliminates most of the slots and open spaces from exposing to the outside, which may cause injury to the user during the opening and folding of the scooter.

BRIEF DESCRIPTION OF THE DRAWINGS

The above and other aspects, features, and advantages of the present invention will become more apparent upon consideration of the following detailed description of preferred embodiments, taken in conjunction with the accompanying figures, wherein: —

FIG. 1a is a perspective view of a foldable scooter currently available in the market.

FIG. 1b is a partial perspective view of the foldable scooter in FIG. 1a.

DESCRIPTION OF A PREFERRED EMBODIMENT OF THE INVENTION

Figure 2:
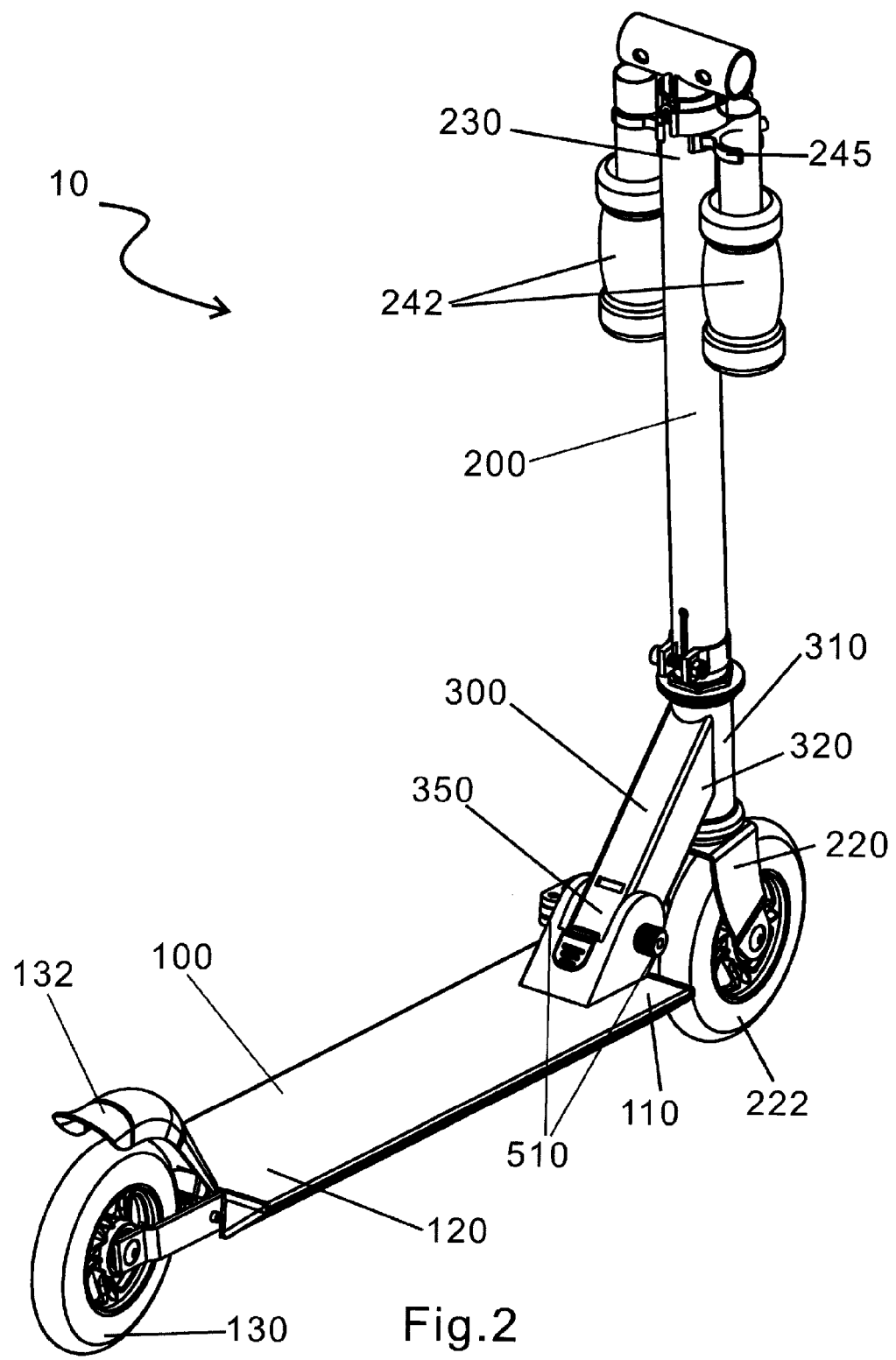
FIG. 2 is a perspective view of an embodiment of this invention.
Figure 3:
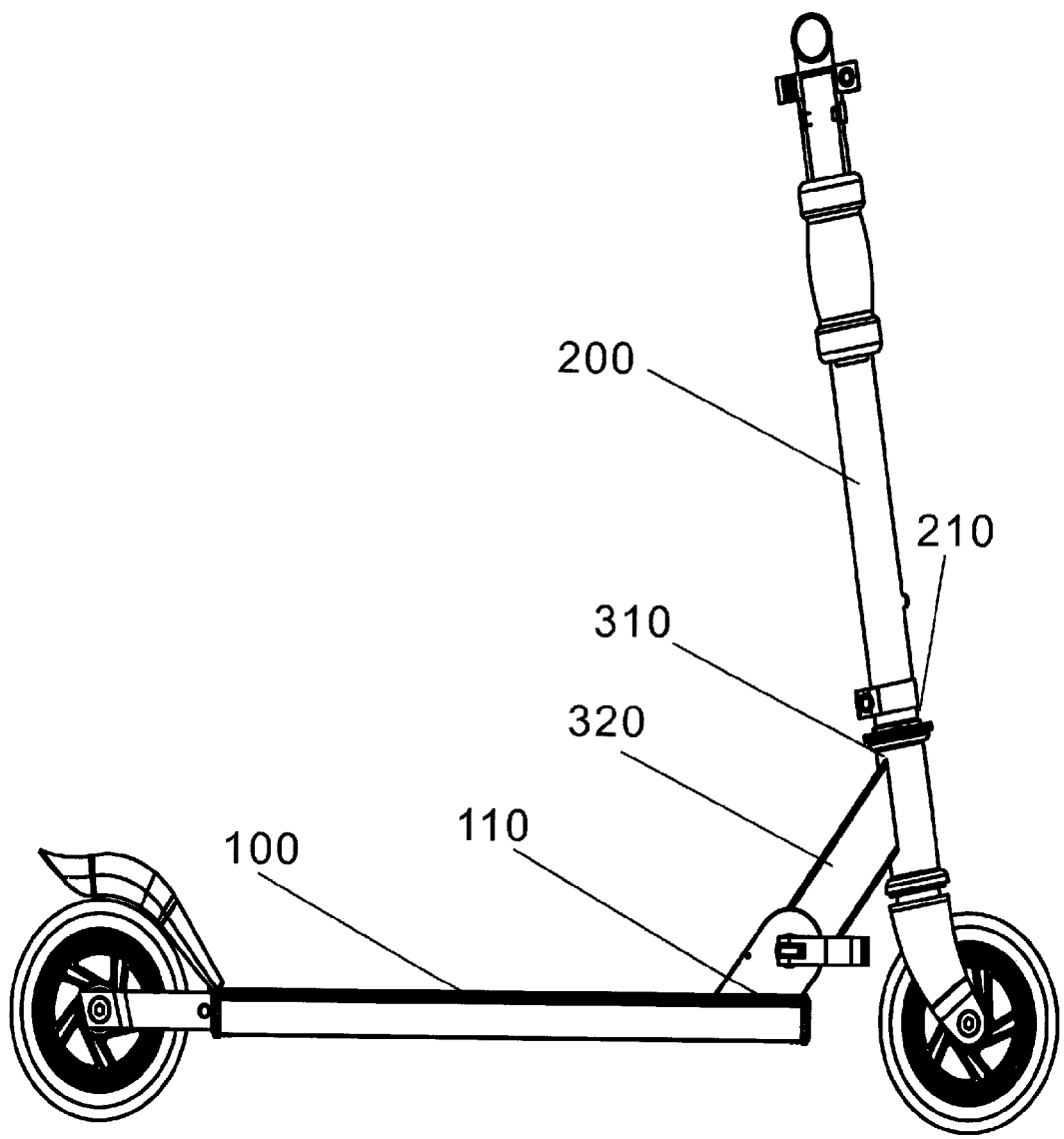
FIG. 3 is a side view of the foldable scooter in FIG. 2 in the open condition.
Figure 4:
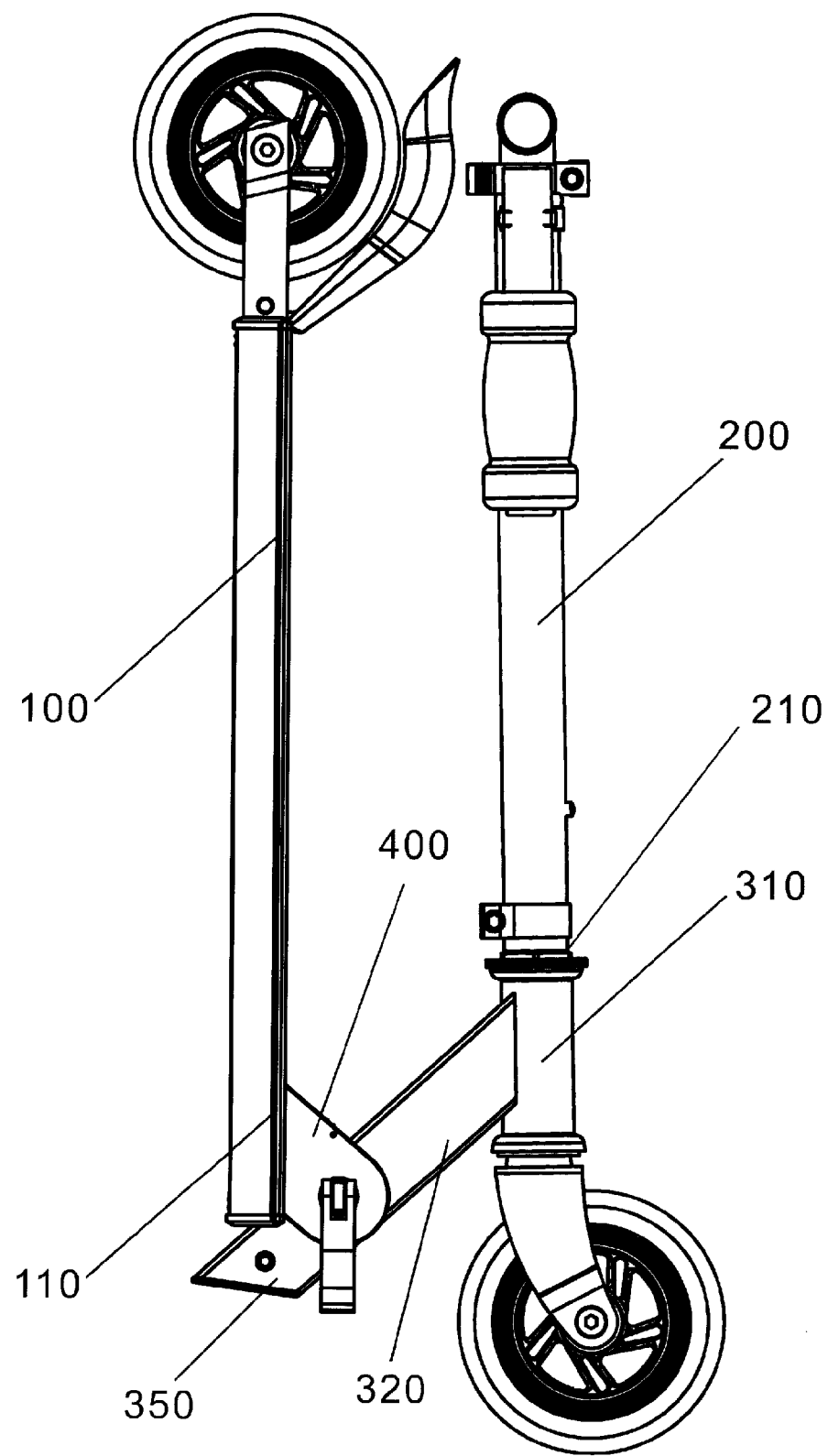
FIG. 4 is a side view of the foldable scooter in FIG. 2 in the folded condition.

As shown in FIGS. 2, 3 and 4, a preferred embodiment of the present invention is a scooter 10 including a footboard 100, a steering column 200 and a connecting member 300 connecting the footboard 100 to the steering column 200.

The connecting member 300 has a front portion 310 rotatably connected to the steering column 200, a rear portion 350 pivotally connected to a front portion 110 of the footboard 100 and an elongated housing 320 in between the front portion 310 and the rear portion 350. The front portion 310, for example, is a cylindrical hollow column surrounding a lower portion 210 of the steering column 200 such that the steering column 200 can be turned freely inside the front portion 310.

Figure 5:
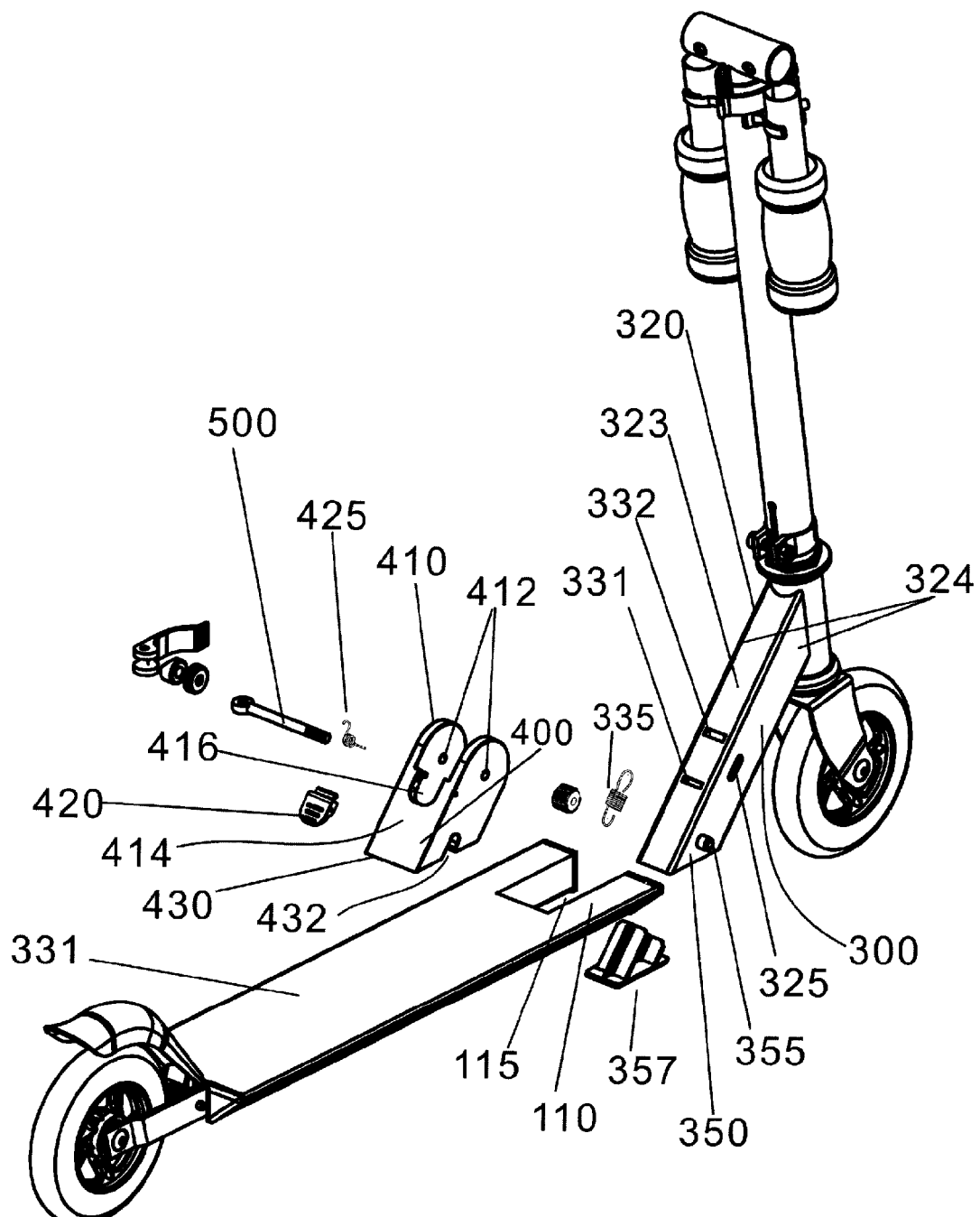
FIG. 5 is an explosive view of the foldable scooter in FIG. 2.

As shown in FIG. 5, the elongated housing 320 has a first covering surface 323 and two walls 324 on the side. The rear portion 350 includes a stopper 355 extending through the rear portion 350 and extending out from the side walls 324. A cut-out portion 115 is formed at the front portion 110 of the footboard 100 for attaching an extended open housing 400. A pair of notches 432 is formed at a base 430 of the extended open housing 400 for engaging with the stopper 355. The extended open housing 400 is aligned with and receives the connecting member 300 in the open condition.

A pair of pivot holes 412 is formed at a top portion 410 of the extended open housing 400. A pivot pin 500 is disposed through the pivot holes 412 and a pivot slot 325 for connecting the extended open housing 400 with the connecting member 300. A biasing device 335, for example, a spring is attached between the pivot pin 500 and the stopper 355 inside the elongated housing 320. A lower cover 357 is attached to the rear portion 350 of the connecting member 300 for shielding the pivot pin 500, the stopper 355 and the biasing device 335. A first engaging slot 331 and a second engaging slot 332 are formed on a first covering surface 323.

A cut 416 is formed on a first surface 414 of the extended open housing 400 for receiving a locking member 420. The locking member 420 is pivotally connected to the cut 416 and includes a biasing device 425, for example, a torsion spring. The locking member 420 is rotatable to move between a first and a second locked position.

Figure 6:
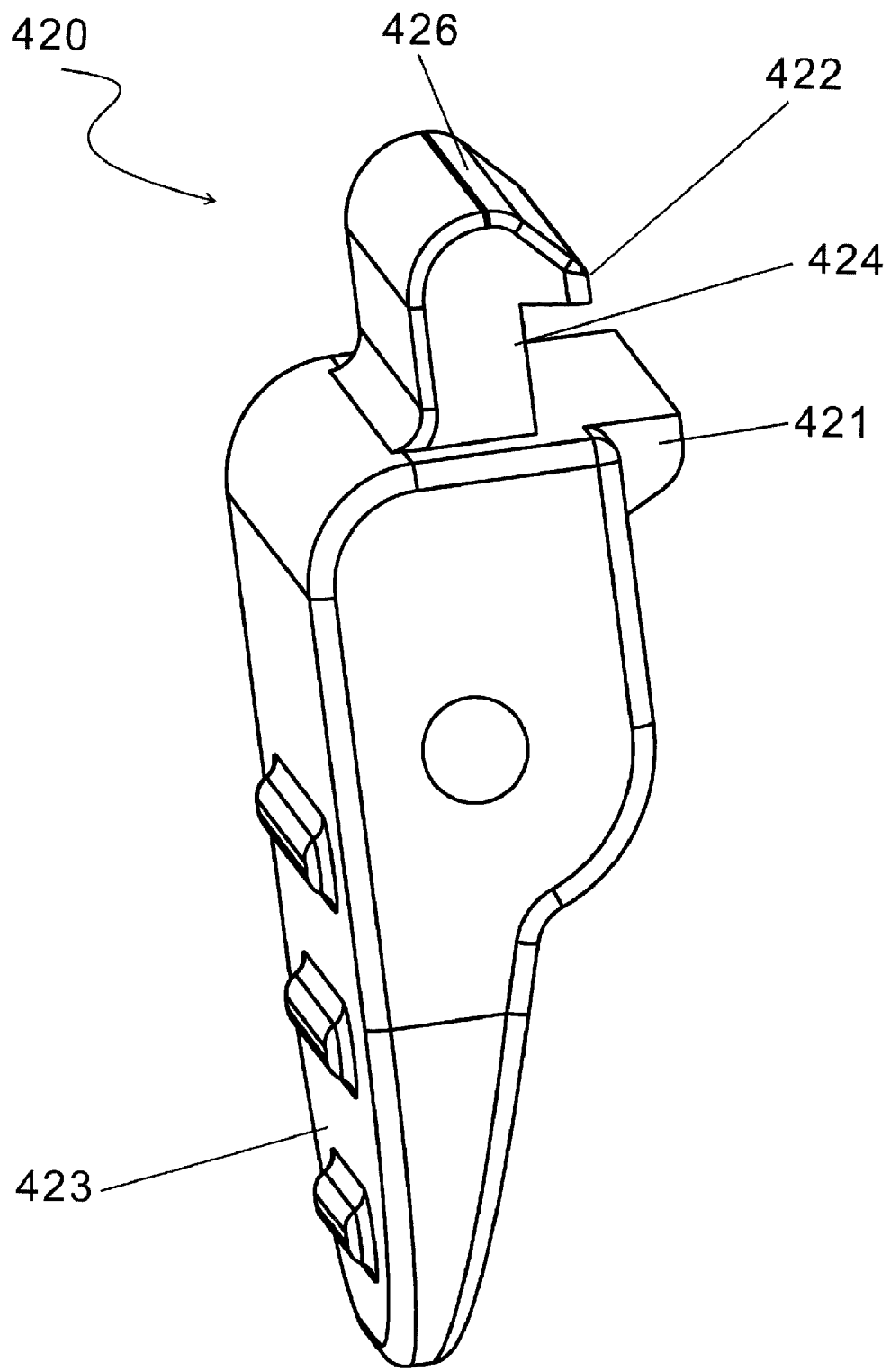
FIG. 6 is a magnified perspective view of the locking member in FIG. 5.

As shown in FIG. 6, the locking member 420 includes a first locking end 421 and a second locking end 422, which engage correspondingly with the first engaging slot 331 and the second engaging slot 332 on the connecting member 300 in the first and second locked positions respectively. The biasing device 425 biases the locking ends 421, 422 to rotate against the corresponding first and second engaging slots 331, 332 in the corresponding locked positions. The locked positions may be released by pressing an actuating end 423 which disengage the locking ends 421, 422 from the corresponding first and second engaging slots 331, 332.

The first locking end 421 is disposed substantially at 90 degrees from the actuating end 423. The second locking end 422 is L-shaped for extending into the second engaging slot 332 and engaging with the first covering surface 323 at the second engaging slot 332 in the second locked position. The second locking end 422 has a smooth outer surface 426 for interacting with the first covering surface 323 and guiding said second locking end to enter into said second engaging slot 332. The first and second locking ends 421, 422 form a C-shaped end 424 on the locking member 420 for engaging with the second engaging slot 332.

Figure 7:
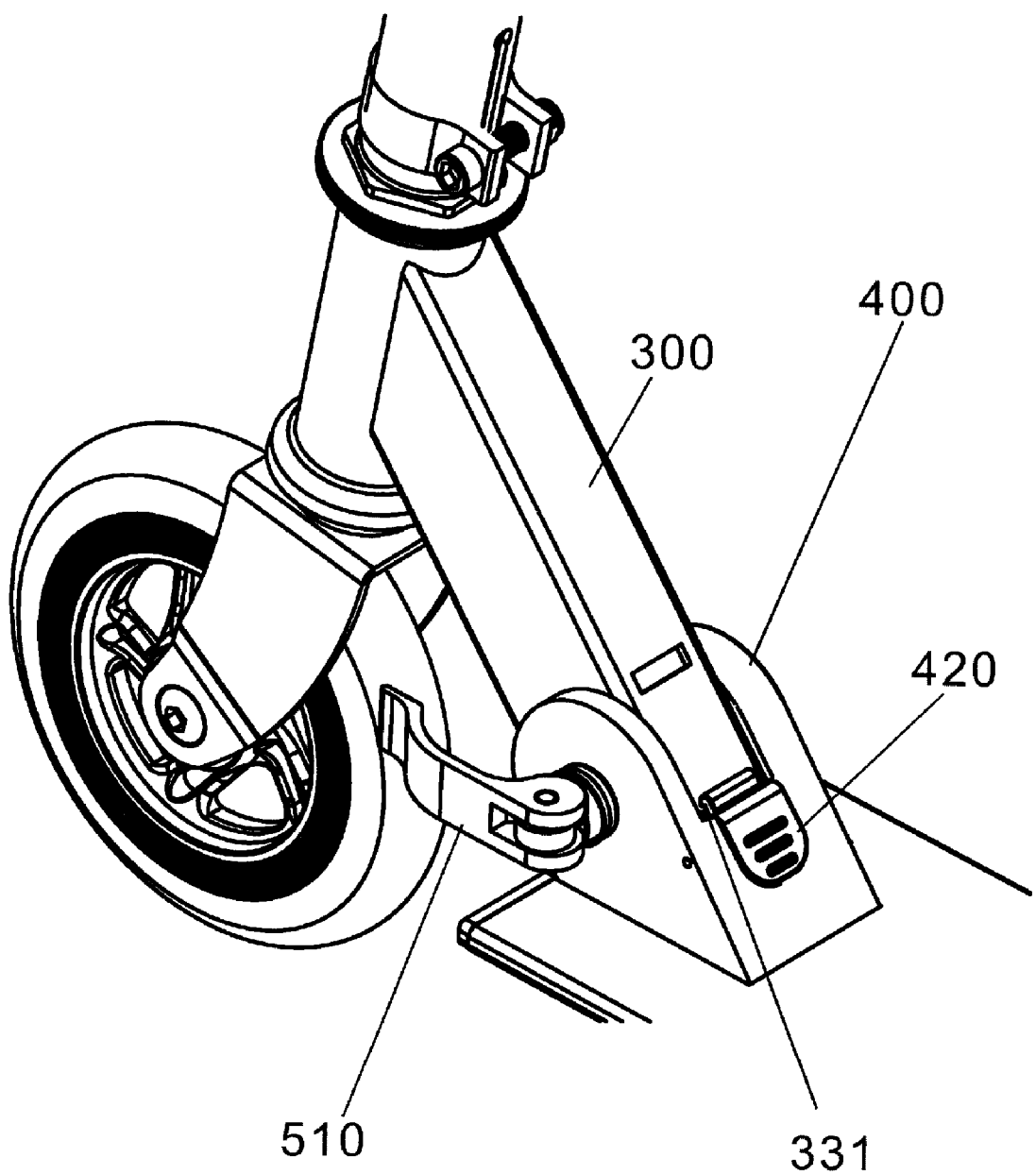
FIG. 7 shows the first locked position of the locking member in FIG. 5 in the open condition.
Figure 8A:
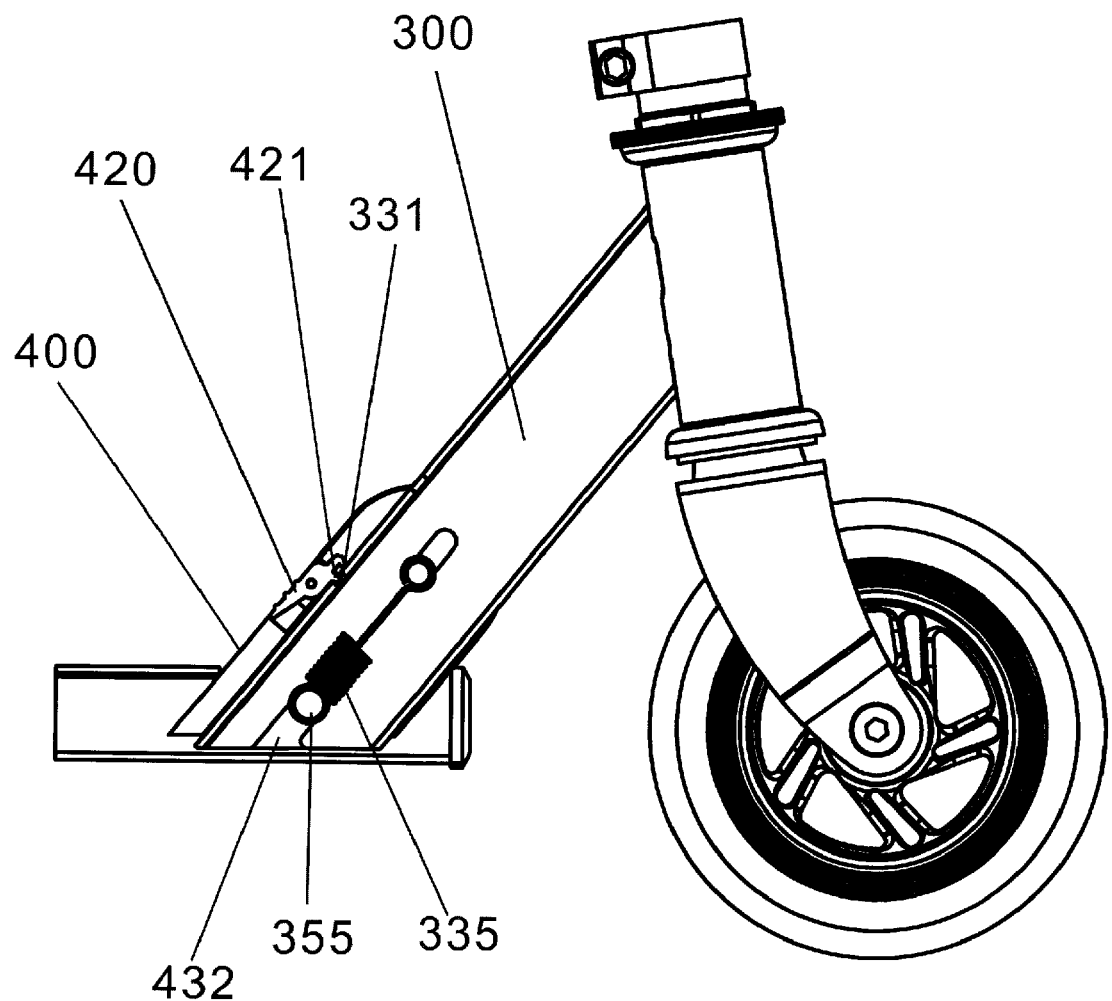
FIGS. 8a-d illustrate the corresponding positions of the locking member, the stopper, and the notches in FIG. 5 between the open and folded conditions.

As shown in FIGS. 7 and 8a, the locking member 420 is in the first locked position in the open condition. The first locking end 421 is engaged with the first engaging slot 331 and is biased against it by the biasing device 425. In this first locked position, the connecting member 300 is prevented from sliding downward with respect to the extended open housing 400. The biasing device 335 biases the stopper 355 against the notches 432 to lock the stopper 355 on the notches 432. In this open condition, a quick release set 510 is further provided to fix the extended open housing 400 securely to the connecting member 300.

Figure 8B:
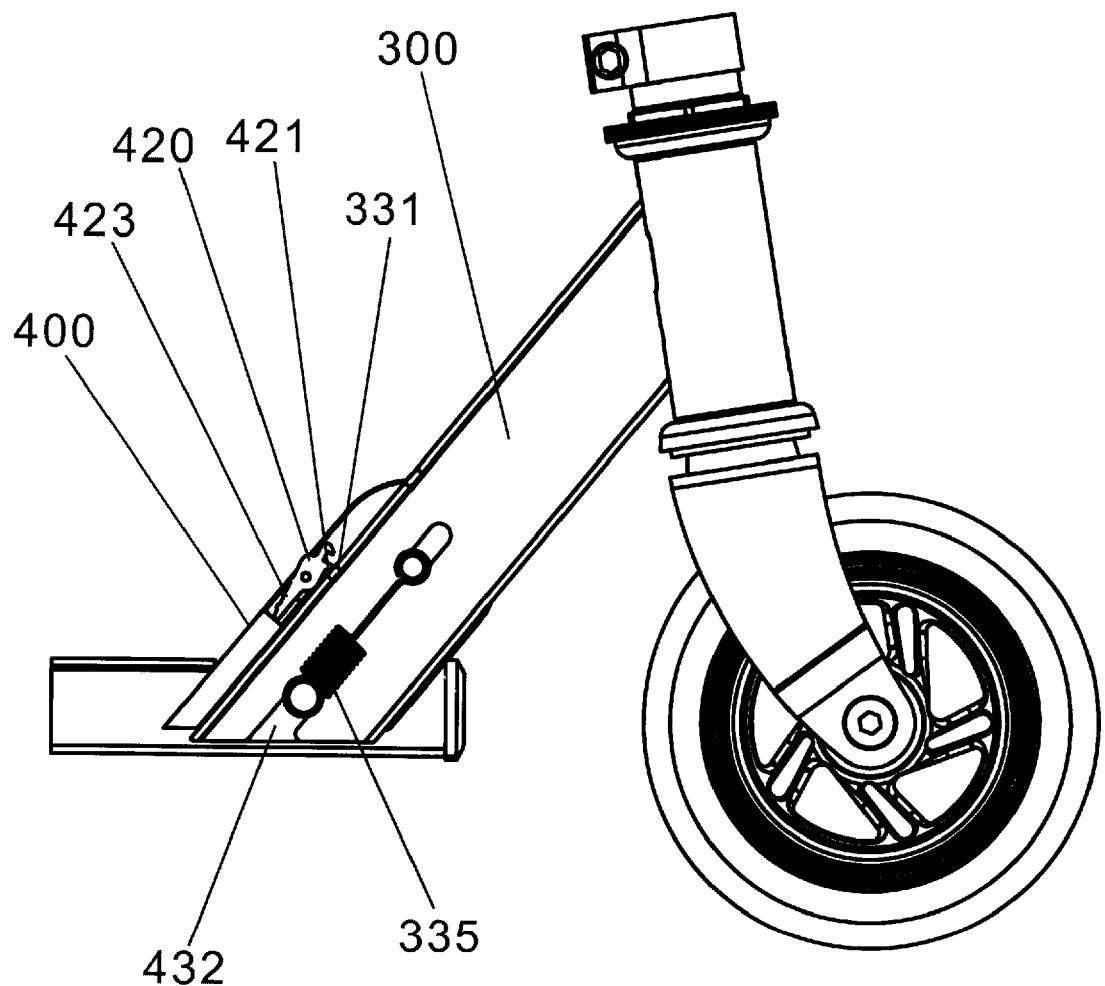

As shown in FIG. 8b, to fold the scooter 10, the quick release set 510 is first released. The actuating end 423 is pressed to disengage the first locking end 421 from the first engaging slot 331.

Figure 8C:
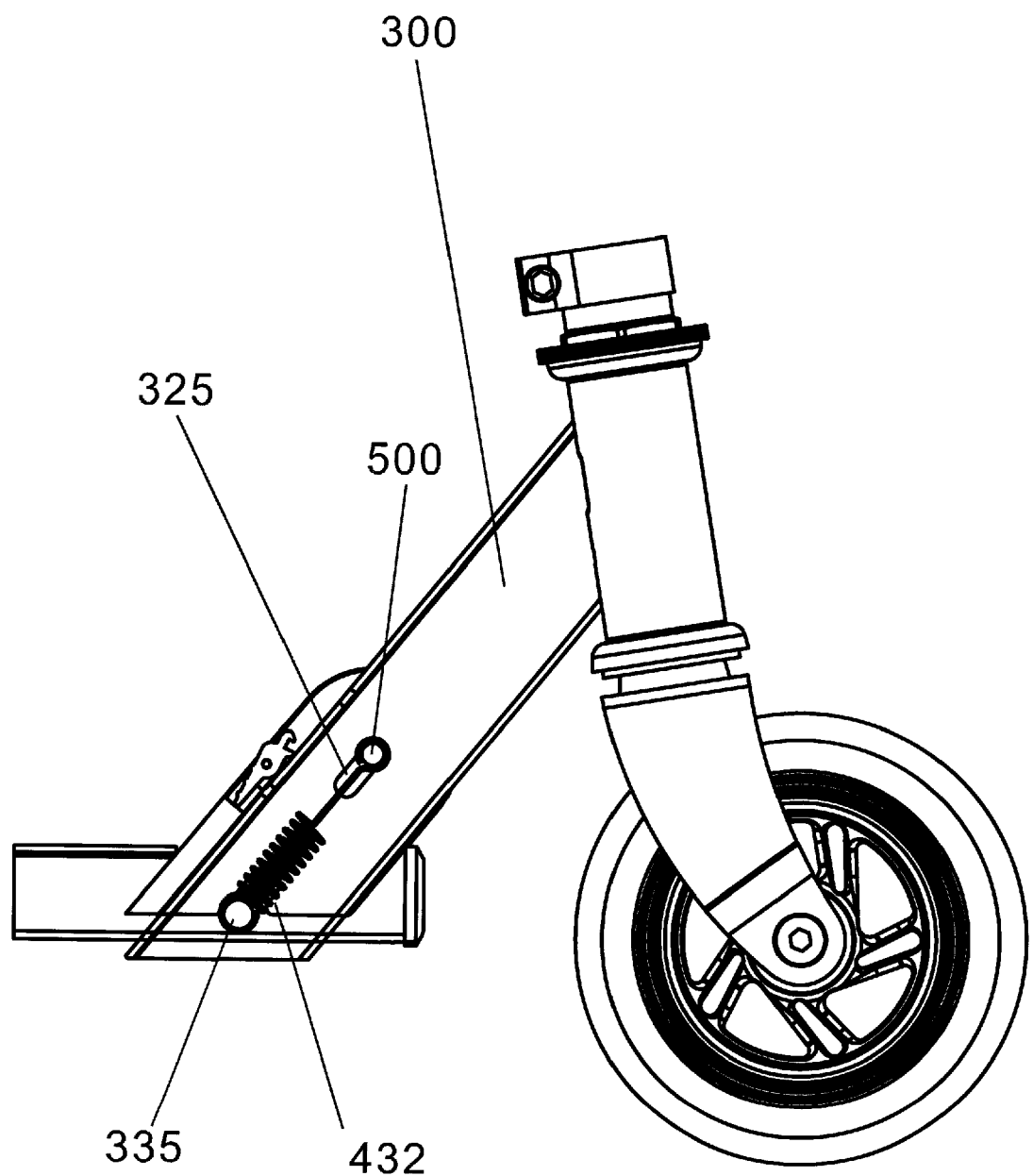

As shown in FIG. 8c, the connecting member 300 is slid downward to remove the stopper 355 from the notches 432. The pivot pin 500 is slidable along the pivot slot 325 when the stopper 355 is disengaged from the notches 432.

Figure 8D:
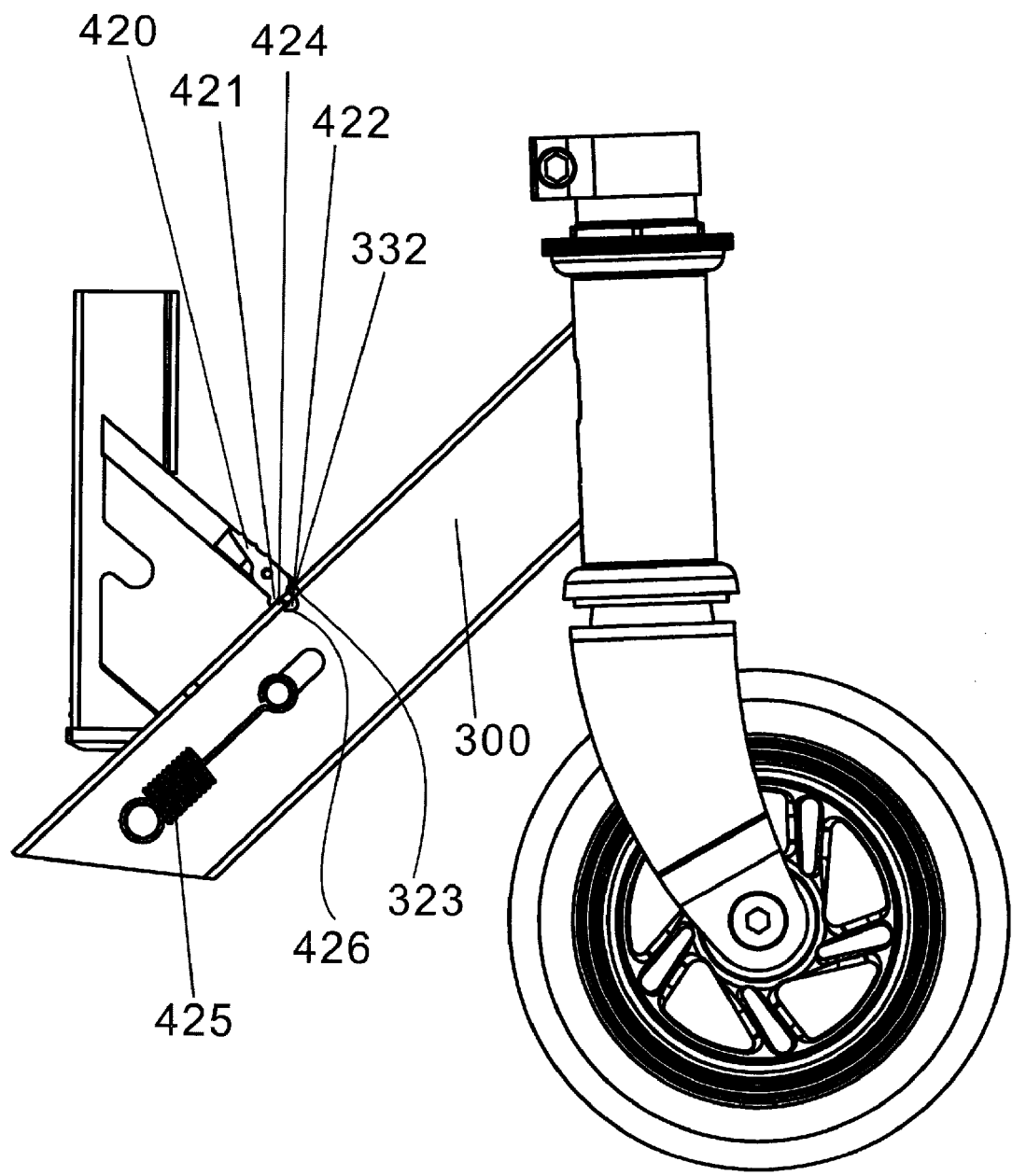
Figure 9:
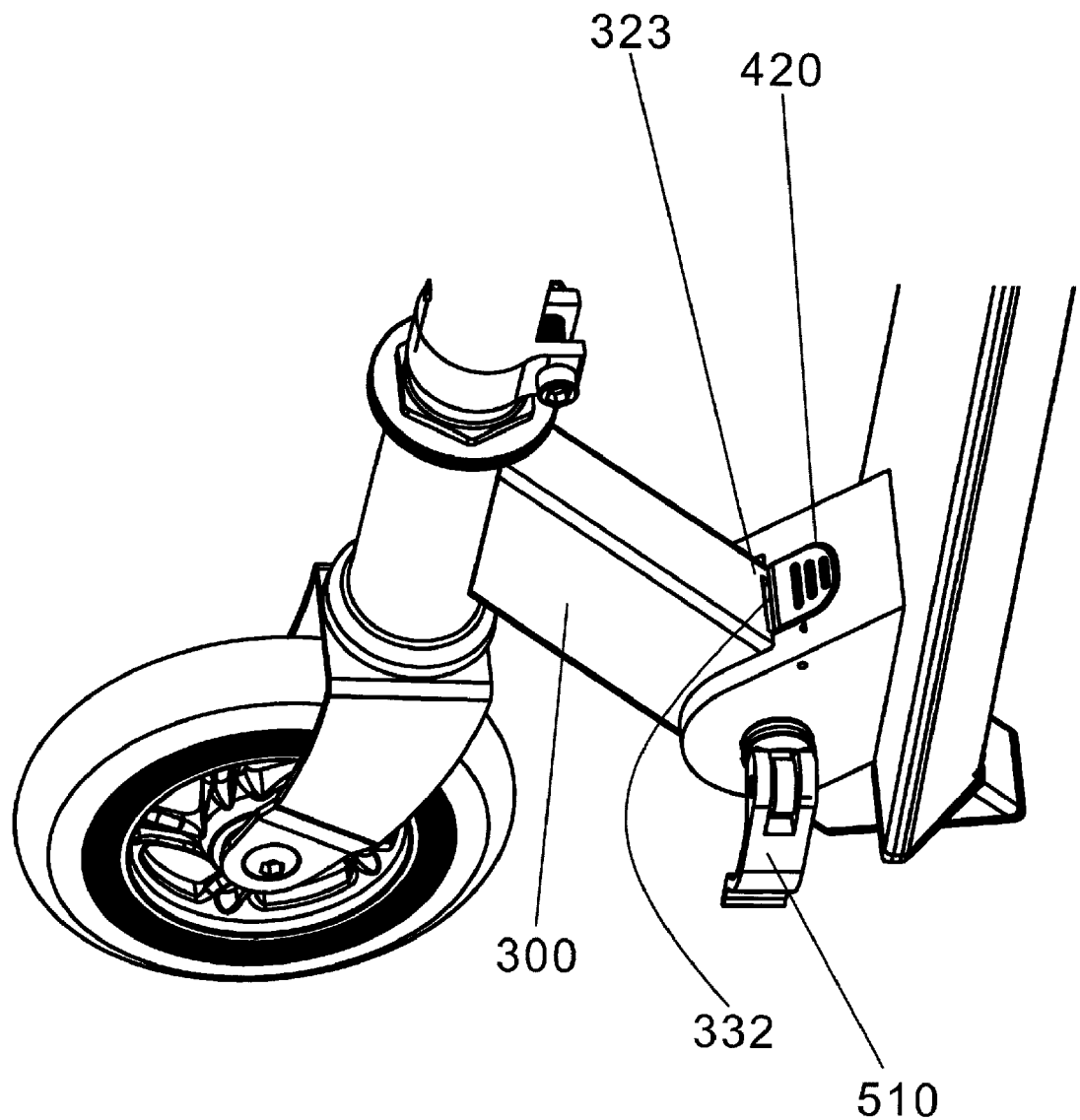
FIG. 9 shows the second locked position of the locking member in FIG. 5 in the folded condition.

As shown in FIGS. 8d and 9, the connecting member 300 is rotated substantially 90 degrees to the closed condition. The smooth outer surface 426 of the second locking end 422 interacts with the first covering surface 323 near the second engaging slot 332 to guide the second locking end 422 to enter into the second engaging slot 332. The locking member 420 is in the second locked position when the second locking end 422 is engaged with the second engaging slot 332. The first and second locking ends 421, 422 form a C-shaped end 424 for engaging securely with the second engaging slot 332. In the second locked position, the biasing device 425 biases the C-shaped end 424 to rotate toward the first covering surface 323, which engages with the first covering surface 323 at the second engaging slot 332, and prevents the connecting member 300 from rotating and returning to the open condition. The quick release set 510 is fastened to secure the connecting member 300 against the extended open housing 400.

To open the scooter 10, the quick release set 510 is released and the actuating end 423 is pressed to release the second locking end 422 from the second engaging slot 332. The connecting member 300 is rotated back to the open condition. The stopper 355 is engaged with the notches 432. The locking member 420 is biased by the biasing device 425 to return to the first locked position.

As shown in FIG. 2, a rear wheel 130 and a fender 132 for braking the rear wheel 130 are attached to the rear portion 120 of the footboard 100. The steering column 200 may be telescopic for reducing the height when being folded. A front wheel 222 is attached to the lower end 220 of the steering column 200. A steering handle 242 is attached to the upper end 230 of the steering column 200. The steering handle 242 may be detached and mounted on a clip 245 attached to the steering column 200 in the folded condition.

The embodiments described in this specification and the contents disclosed therein are provided by way of illustration only. The invention can be applied equally well on other types of foldable scooter.

While the invention has been described in detail with reference to disclosed embodiments, various modifications within the scope of the invention will be apparent to those of ordinary skill in this technological field. It is to be appreciated that features described with respect to one embodiment typically may be applied to other embodiments.

What is claimed is:

1. A foldable scooter operating between an open condition and a folded condition, comprising:
   a footboard having a front portion, a rear portion attached to a rear wheel, an extended open housing having a top portion and a base, and at least one notch disposed at the base of said housing;
   a steering column having a lower end attached to a front wheel and an upper end attached to a steering handle;
   a connecting member having
      a front portion rotatably connected to said steering column,
      a rear portion pivotally connected to the front portion of said footboard, and
      a stopper disposed at the rear portion of said connecting member for engaging said connecting member with said notch in the open condition, wherein said housing is aligned with and receiving the connecting member in the open condition;
   a rotatable locking member having
      a first biasing device for biasing the locking member against said connecting member in the open and folded conditions,
      an actuating end,
      a first locking end rotatable to a first locked position for locking said connecting member to said footboard in the open condition, and a second locking end rotatable to a second locked position for locking said connecting member to said footboard in the folded condition, wherein the locking member is released from the first and second locked positions by pressing said actuating end.

2. The foldable scooter as recited in claim 1, wherein said housing further comprises a pivot hole formed on the top portion, said connecting member further comprises a pivot slot, wherein said housing and said connecting member are connected by a pivot pin disposed through said pivot hole and pivot slot, said pivot pin is slidable along said pivot slot for said stopper to engage and disengage with said notch.

3. The foldable scooter as recited in claim 2, wherein a second biasing device is attached between said pivot pin and said stopper for biasing said stopper against said notch in the open condition.

4. The foldable scooter as recited in claim 3, wherein a cover is disposed at the rear portion of said connecting member for shielding said pivot pin and second biasing device.

5. The foldable scooter as recited in claim 3, wherein said second biasing device is a spring.

6. The foldable scooter as recited in claim 1, wherein said connecting member is slidable along said housing when said stopper is engaged with or disengaged from said notch.

7. The foldable scooter as recited in claim 1, wherein a first slot and a second slot is disposed on said connecting member for engaging with said corresponding first and second locking ends.

8. The foldable scooter as recited in claim 7, wherein said second locking end is substantially L-shaped for engaging with said second slot in the second locked position.

9. The foldable scooter as recited in claim 7, wherein said second locking end has a smooth outer surface for guiding said second locking end to enter into said second engaging slot.

10. The foldable scooter as recited in claim 7, wherein said first locking end and said second locking end forms a C-shaped end for engaging with said second slot in the second locked position.

11. The foldable scooter as recited in claim 1, wherein said first locking end is substantially parallel with said second locking end.

12. The foldable scooter as recited in claim 1, wherein said first locking end is disposed substantially at 90 degrees from said actuating end.

13. The foldable scooter as recited in claim 1, wherein said second locking end is disposed substantially at 90 degrees from said actuating end.

14. The foldable scooter as recited in claim 1, wherein said housing comprises a first surface, said locking member is pivotally connected to a cut formed on said first surface, and is substantially aligned with said first surface, whereby said locking member does not stick out from said first surface to cause danger to the user.

15. The foldable scooter as recited in claim 1, further comprises a quick release set for fastening said housing against said connecting member.

16. The foldable scooter as recited in claim 1, wherein said first biasing device is a torsion spring.

\* \* \* \* \*